US008472402B2

(12) United States Patent
Son et al.

(10) Patent No.: US 8,472,402 B2
(45) Date of Patent: Jun. 25, 2013

(54) APPARATUS AND METHOD FOR ASSIGNING MOBILE STATION IDENTIFIER IN WIRELESS COMMUNICATION SYSTEM

(75) Inventors: Jung-Je Son, Yongin-si (KR); Sung-Jin Lee, Suwon-si (KR); Jae-Hyuk Jang, Suwon-si (KR); Geun-Hwi Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 794 days.

(21) Appl. No.: 12/499,381

(22) Filed: Jul. 8, 2009

(65) Prior Publication Data
US 2010/0008327 A1 Jan. 14, 2010

(30) Foreign Application Priority Data

Jul. 8, 2008 (KR) .................. 10-2008-0065975
Jul. 7, 2009 (KR) .................. 10-2009-0061581

(51) Int. Cl.
*H04W 36/00* (2009.01)
*H04M 1/00* (2006.01)
*H04B 7/00* (2006.01)

(52) U.S. Cl.
USPC ............ 370/331; 455/436; 455/561; 455/525

(58) Field of Classification Search
USPC .............. 455/435.1, 436, 438, 439, 442, 502, 455/435.2, 435.3, 443, 444, 446, 449, 456.1, 455/524, 525, 63.2, 561, 517; 370/331, 332
See application file for complete search history.

(56) References Cited

U.S. PATENT DOCUMENTS

2006/0030322 A1* 2/2006 Kim et al. ............... 455/436
2008/0225794 A1* 9/2008 Dore et al. ............... 370/331
2010/0118833 A1* 5/2010 Hahn et al. ............... 370/331

* cited by examiner

*Primary Examiner* — Kent Chang
*Assistant Examiner* — Nelson Rosario
(74) *Attorney, Agent, or Firm* — Jefferson IP Law, LLP

(57) ABSTRACT

An apparatus and a method for providing a handover using an Mobile Station IDentifier (MS ID) in a wireless communication system are provided. In the method, at least one Base Station (BS) ID index assigned to a serving base station by at least one neighbor base station is confirmed. A target base station for a handover is confirmed. A temporary MS ID is formed using a BS ID index assigned to the serving base station by the target base station, and an MS ID index assigned to the mobile station by the serving base station. A network re-entry procedure with the target base station is performed using the temporary MS ID. Communication with the serving base station is performed until the network re-entry procedure with the target base station is completed.

24 Claims, 11 Drawing Sheets

| DL_MAP(CID1) | DL_MAP(CID2) |
| :---: | :---: |
| DL_MAP(CID3) | DL_MAP(CID5) |
| DL_MAP(CID4) | |

FIG.1
(CONVENTIONAL ART)

| ╱200 | ╱210 |
| :---: | :---: |
| BS ID INDEX | MS ID INDEX |

FIG.2

APPARATUS AND METHOD FOR ASSIGNING MOBILE STATION IDENTIFIER IN WIRELESS COMMUNICATION SYSTEM

PRIORITY

This application claims the benefit under 35 U.S.C. §119 (a) of a Korean patent application filed in the Korean Intellectual Property Office on Jul. 8, 2008 and assigned Serial No. 10-2008-0065975 and the Korean Intellectual Property Office on Jul. 7, 2009 and assigned Serial No. 10-2009-0061581, the entire disclosure of which is hereby incorporated by reference.

BACKGROUND OF THE INVENTION

1. Field of the Invention

The present invention relates to an apparatus and a method for assigning a Mobile Station IDentifier (MS ID) in a wireless communication system. More particularly, the present invention relates to an apparatus and a method for forming and assigning an MS ID including neighbor base station information in a wireless communication system.

2. Description of the Related Art

In a wireless communication system, a base station and a mobile station identify a service connection using a Connection IDentifier (CID). For example, in a communication system using the Institute of Electrical and Electronics Engineers (IEEE) 802.16 standard, when an initial setting is completed, a base station and a mobile station generate CIDs having 16 bits such as a basic CID and a primary management CID. Also, in case of providing a new service, the base station and the mobile station generate a transmission CID for a new service connection. After that, to identify resource assignment information for a specific mobile station, the base station forms a MAP to include a basic CID of a relevant mobile station. For example, the base station forms a downlink MAP to include a CID of a mobile station as illustrated in FIG. 1.

FIG. 1 illustrates a MAP construction which uses a CID in a conventional wireless communication system.

Referring to FIG. 1, downlink MAPs include a CID of a relevant mobile station in order to identify the mobile station corresponding to resource assignment information of the downlink MAPs.

A mobile station may confirm resource assignment information assigned by a base station using a MAP including a CID associated with the mobile station itself among MAPs received from the base station.

A transmission terminal incorporates a CID representing a service connection into a Media Access Control (MAC) header of data and transmits the data. In this case, a reception terminal may confirm whether received data is data for the service connection assigned to the reception terminal through the CID contained in the MAC header of the data.

As described above, the base station and the mobile station identify a service connection using a CID. Therefore, each CID should have a unique value which does not overlap another CID inside a cell managed by the base station.

In the case where a mobile station performs a handover, the mobile station should replace a CID, which has been used for communication with a serving base station, with a CID to be used for a target base station in order to prevent the CIDs from overlapping. Here, the serving base station denotes a base station accessed by the mobile station before the mobile station performs the handover, and the target base station denotes a base station to be newly accessed by the mobile station through the handover. In this case, the mobile station replaces all CIDs even when CIDs which have been used for the serving base station overlap only some of the CIDs used by a different mobile station in a target base station.

In the case where the mobile station performs the handover, the serving base station transmits CID information, assigned to the mobile station by candidate base stations to which the mobile station may perform a handover, to the mobile station through a handover response message HandOver(HO)-ReSPonse(RSP) in order to update CIDs of the mobile station. Accordingly, the size of the handover response message HO-RSP increases.

Also, the transmission terminal incorporates CIDs into relevant data and transmits the data so that the reception terminal may identify a service connection corresponding to the received data. Accordingly, the CIDs contained in the data act as a fixed overhead of transmission data.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for forming and assigning an MS ID including neighbor base station information in a wireless communication system.

Another aspect of the present invention is to provide an apparatus and a method for allowing a base station and a mobile station to perform communication with each other using a temporary MS ID formed of a Base Station IDentifier (BS ID) index and an MS ID index in a wireless communication system.

Still another aspect of the present invention is to provide an apparatus and a method for allowing base stations to share a BS ID index assigned to a neighbor base station in a wireless communication system.

Yet another aspect of the present invention is to provide an apparatus and a method for allowing a base station to perform communication with a mobile station which accesses the base station through a handover using a temporary MS ID formed of a BS ID index assigned to a neighbor base station by the base station in a wireless communication system.

According to an aspect of the present invention, a method for performing, at a mobile station, a handover in a wireless communication system is provided. The method includes confirming at least one Base Station IDentifier (BS ID) index assigned to a serving base station by at least one neighbor base station, confirming a target base station for a handover, forming a temporary Mobile Station IDentifier (MS ID) using a BS ID index assigned to the serving base station by the target base station, and an MS ID index assigned to the mobile station by the serving base station, performing a network re-entry procedure with the target base station using the temporary MS ID and performing communication with the serving base station until the network re-entry procedure with the target base station is completed.

According to another aspect of the present invention, a method for supporting, at a base station, a handover of a mobile station in a wireless communication system is provided. The method includes assigning at least one BS ID index to at least one neighbor base station, when the handover of the mobile station is indicated from the neighbor base station, forming a temporary MS ID for the mobile station using a BS ID index assigned to a neighbor base station, and an MS ID index assigned to the mobile station performing the handover by the neighbor base station and performing a network re-entry procedure with the mobile station using the temporary MS ID.

According to still another aspect of the present invention, an apparatus of a mobile station for a handover in a wireless communication system is provided. The apparatus includes a transmitter for transmitting a signal via a radio resource, a receiver for receiving a signal via a radio resource, an MS ID forming unit for forming a temporary MS ID using a BS ID index assigned to a serving base station by a target base station for the handover, and an MS ID index assigned to the mobile station by the serving base station and a controller for, when the handover to the target base station is performed, performing a control to perform a network re-entry procedure with the target base station using the temporary MS ID formed by the MS ID forming unit, and performing a control to perform communication with the serving base station until the network re-entry procedure with the target base station is completed.

According to further another aspect of the present invention, an apparatus of a base station, for supporting a handover of a mobile station in a wireless communication system is provided. The apparatus includes a transmitter for transmitting a signal via a radio resource, a receiver for receiving a signal via a radio resource, a BS ID index setting unit for assigning at least one base station ID index to at least one neighbor base station, a wired interface for transmitting the base station ID index assigned to the neighbor base station to at least one neighbor base station, an MS ID forming unit for, when the handover of the mobile station is indicated from the neighbor base station via the wired interface, forming a temporary MS ID for the mobile station using a base station ID index assigned to the neighbor base station, and an MS ID index assigned to the mobile station performing the handover by the neighbor base station and a controller for performing a control to perform a network re-entry procedure with the mobile station using the temporary MS ID.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which:

FIG. 1 illustrates a MAP construction which uses a CID in a conventional wireless communication system;

FIG. 2 illustrates a construction of an MS ID in a wireless communication system according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

Figure 3:
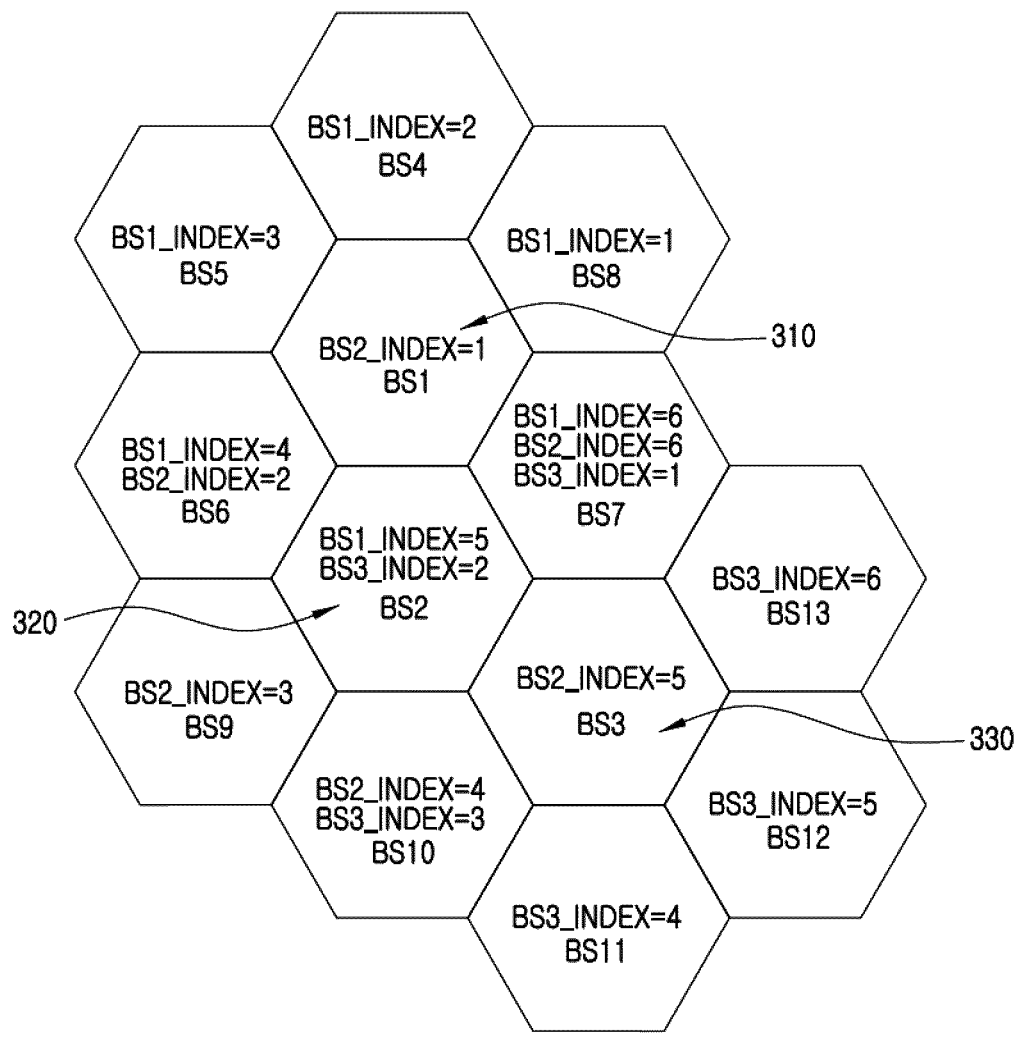
FIG. 3 illustrates a construction of a wireless communication system assigning base station ID indexes to neighbor base stations according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. Exemplary embodiments of the present invention provide a technique for improving a handover performance using an MS ID configured to represent a neighbor base station in a wireless communication system.

In the following description, of base stations forming a wireless communication system, a base station which has provided a service to a mobile station is called a serving base station, and a base station which the mobile station is to newly access through a handover is called a target base station.

In the wireless communication system, a base station and a mobile station identify a service connection set between the base station and the mobile station using a Mobile Station ID (MS ID) and a flow ID. Accordingly, the base station assigns an MS ID to the mobile station through an initial setting operation with the mobile station. For example, when the mobile station requests a network entry, the base station assigns an MS ID to the mobile station.

After assigning the MS ID to the mobile station, the base station generates a flow ID to represent service generation with the mobile station to which the MS ID has been assigned, and a connection supporting this service. Accordingly, a transmission terminal incorporates a flow ID of a service connection corresponding to data into a MAC header of the data, and transmits the data. A reception terminal determines whether received data is for the service connection assigned to the reception terminal through the flow ID contained in the MAC header of the data received from the transmission terminal.

The base station and the mobile station may perform communication using an MS ID configured to represent neighbor base station information as illustrated in FIG. 2.

FIG. 2 is a view illustrating a construction of an MS ID in a wireless communication system according to an exemplary embodiment of the present invention.

Referring to FIG. 2, the MS ID includes a BS ID index 200 and an MS ID index 210.

The BS ID index 200 denotes identification information of a base station which has assigned the MS ID index 210. For example, in the case where a base station in communication assigns the MS ID index 210 forming the MS ID, the BS ID index 200 of the MS ID is set to '0'. That is, assuming that an MS ID includes an 11-bit MS ID index 210 and a 5-bit BS ID index 200, the BS ID index 200 is set to '00000'. Here, the lengths of the BS ID index 200 and the MS ID index 210 may be changed when needed.

In contrast, if a neighbor base station assigns an MS ID index 210 forming an MS ID, a BS ID index 200 of the MS ID is set to a BS ID index 200 which has been assigned to the neighbor base station by the base station in communication. That is, the base station may set the BS ID index 200 of the MS ID using BS ID indexes assigned to neighbor base stations as illustrated in FIG. 3.

FIG. 3 is a view illustrating a construction of a wireless communication system assigning base station ID indexes to neighbor base stations according to an exemplary embodiment of the present invention.

Referring to FIG. 3, a base station 1 310 assigns BS ID indexes illustrated in Table 1 to neighbor base stations.

TABLE 1

| BS | BS ID index |
| --- | --- |
| BS 8 | 1 |
| BS 4 | 2 |
| BS 5 | 3 |
| BS 6 | 4 |
| BS 2 | 5 |
| BS 7 | 6 |

Also, a base station 2 320 assigns BS ID indexes illustrated in Table 2 to neighbor base stations.

TABLE 2

| BS | BS ID index |
| --- | --- |
| BS 1 | 1 |
| BS 6 | 2 |
| BS 9 | 3 |
| BS 10 | 4 |
| BS 3 | 5 |
| BS 7 | 6 |

Also, a base station 3 330 assigns BS ID indexes illustrated in Table 3 to neighbor base stations.

TABLE 3

| BS | BS ID index |
| --- | --- |
| BS 7 | 1 |
| BS 2 | 2 |
| BS 10 | 3 |
| BS 11 | 4 |
| BS 12 | 5 |
| BS 13 | 6 |

Base stations assign BS ID indexes illustrated in Tables 1, 2, and 3 to neighbor base stations. Accordingly, when forming an MS ID of a mobile station using an MS ID index assigned by a neighbor base station, a base station forms the MS ID using a BS ID index assigned to the neighbor base station by the base station itself, and an MS ID index assigned to the mobile station by the neighbor base station.

A base station forms a resource assignment message including MS IDs of mobile stations so that the mobile stations may identify resource information assigned to them from the resource assignment message. For example, the base station forms a downlink MAP as illustrated in FIG. 4 below.

Figure 4:
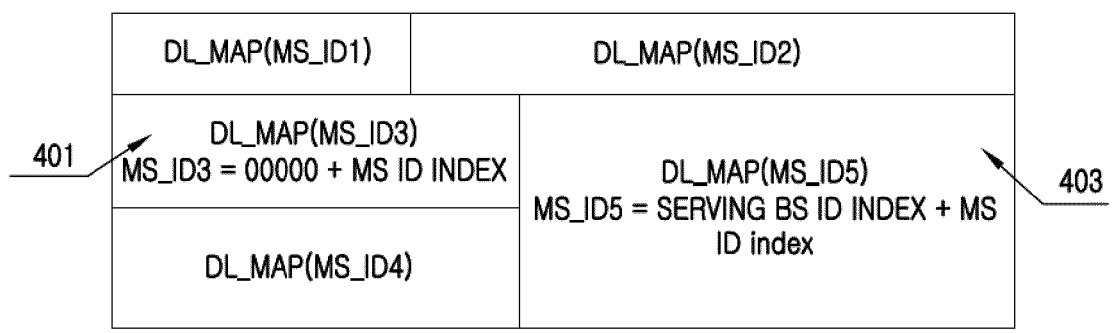
FIG. 4 illustrates a MAP construction which uses MS IDs in a wireless communication system according to an exemplary embodiment of the present invention.

FIG. 4 illustrates a MAP construction which uses MS IDs in a wireless communication system according to an exemplary embodiment of the present invention.

Referring to FIG. 4, downlink MAPs include an MS ID of a relevant mobile station in order to identify the mobile station corresponding to resource assignment information contained in the downlink MAPs. At this point, the MS ID of the mobile station includes a BS ID index representing information of a base station which has assigned an MS ID index as illustrated in FIG. 2. Therefore, in the case where a base station, which forms a downlink MAP, forms an MS ID 3 401 using an MS ID index assigned by the base station itself, the downlink MAP includes the MS ID 3 401 including a BS ID index set to '00000'. In contrast, if a base station, which forms a downlink MAP, forms an MS ID 5 403 using an MS ID index assigned by a neighbor base station, the downlink MAP includes the MS ID 5 403 including a BS ID index set to a BS ID index assigned to the neighbor base station by the base station. In the following description, an MS ID such as the MS ID 5 403 formed using an MS ID index assigned by a neighbor base station is called a temporary MS ID.

As described above, a base station incorporates an MS ID into each downlink MAP and transmits the same so that a mobile station may identify the downlink MAP. That is, the base station may assign a resource to the mobile station or perform communication with the mobile station using a temporary MS ID of the mobile station before a neighbor base station assigns an MS ID to the mobile station performing a handover.

The mobile station may confirm a downlink MAP including resource assignment information of the mobile station using an MS ID contained in the downlink MAP. As illustrated in FIG. 4, in the case where a base station forms a downlink MAP including a temporary MS ID and transmits the same, a mobile station should be able to form in advance a temporary MS ID contained in the downlink MAP. The mobile station should confirm a BS ID index assigned to a neighbor base station by the base station in order to form the same temporary MS ID as the temporary MS ID formed by the base station. Accordingly, the base station transmits BS ID index information assigned from the neighbor base station to the mobile station. For example, the base station incorporates the BS ID index information assigned from the neighbor base station into a neighbor base station information message NBR-ADV, and transmits the same to mobile stations located in its service area as illustrated in FIG. 5.

Figure 5:
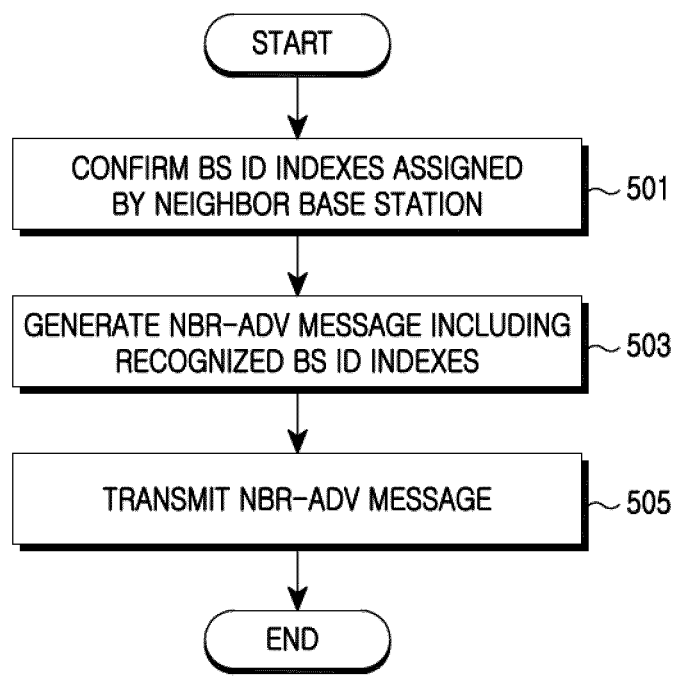
FIG. 5 illustrates a procedure for transmitting, at a base station, a base station ID index to a mobile station in a wireless communication system according to an exemplary embodiment of the present invention.

FIG. 5 is a flowchart illustrating a procedure for transmitting, at a base station, a BS ID index to a mobile station in a wireless communication system according to an exemplary embodiment of the present invention.

Referring to FIG. 5, in step 501, the base station confirms BS ID indexes assigned by neighbor base stations. For example, in FIG. 3, the base station 2 320 confirms a BS ID index 5 assigned from the base station 1 310 and a BS ID index 2 assigned from the base station 3 330 through a backbone.

After confirming the BS ID indexes assigned by the neighbor base stations, the base station generates a neighbor base station information message NeighBoR(NBR)-ADVertisement(ADV) including the confirmed BS ID indexes in step 503.

After generating the neighbor base station information message, the base station broadcasts neighbor base station information messages to mobile stations located in its service area in step 505.

After that, the base station ends the present algorithm.

Figure 6:
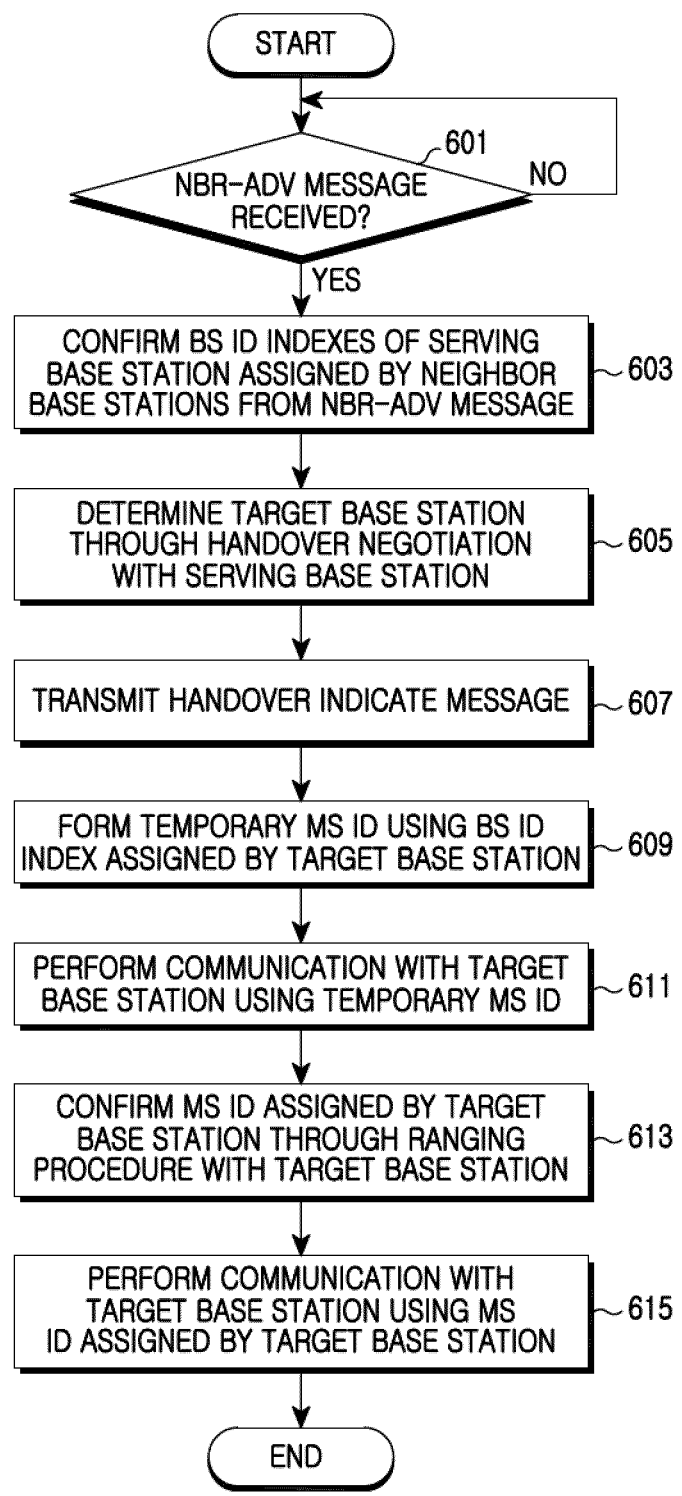
FIG. 6 illustrates a procedure for performing, at a mobile station, a handover in a wireless communication system according to an exemplary embodiment of the present invention.

As described above, the mobile station which has obtained BS ID index information assigned to a serving base station by neighbor base stations performs a handover as illustrated in FIG. 6.

FIG. 6 is a flowchart illustrating a procedure for performing, at a mobile station, a handover in a wireless communication system according to an exemplary embodiment of the present invention.

Referring to FIG. 6, in step 601, the mobile station determines whether a neighbor base station information message NBR-ADV is received.

When the neighbor base station information message is received from a serving base station, the mobile station confirms BS ID index information assigned to the serving base station by neighbor base stations from the neighbor base station information message NBR-ADV in step 603. After that, the mobile station stores the BS ID index information assigned to the serving base station by the neighbor base stations.

After confirming and storing the BS ID index information assigned to the serving base station by the neighbor base stations, the mobile station determines a target base station for a handover through handover negotiation with the serving base station in step 605. For example, the mobile station transmits a handover request to the serving base station and obtains information of candidate base stations which can support the handover of the mobile station. After that, the mobile station determines the target base station for the handover among the candidate base stations.

After determining the target base station, the mobile station transmits a handover indicate message HO-INDication(IND) indicating a handover to the target base station to the serving base station step 607. At this point, the handover indicate message includes ID information of the target base station.

After transmitting the handover indicate message, the mobile station forms a temporary MS ID using a BS ID index assigned to the serving base station by the target base station in step 609. For example, the mobile station forms a temporary MS ID using the BS ID index assigned to the serving base station by the target base station and an MS ID index assigned to the mobile station by the serving base station.

After forming the temporary MS ID, the mobile station performs communication with the target base station using the temporary MS ID in step 611. For example, the mobile station confirms a resource assignment message transmitted by the target base station using the temporary MS ID. Also, the mobile station transmits a bandwidth request message BandWidth(BW)-Request(Req) to the target base station using the temporary MS ID.

In step 613, the mobile station is assigned an MS ID through a ranging procedure with the target base station. For example, the mobile station confirms the MS ID assigned by the target base station from a ranging response message Ranging(RNG)-Response(RSP).

When the MS ID is assigned from the target base station, the mobile station performs communication with the target base station using the assigned MS ID in step 615.

After that, the mobile station ends the present algorithm.

In the above exemplary embodiments, the communication of step 611 between the mobile station and the target base station, and the ranging procedure of step 613 between the mobile station and the target base station may be performed sequentially, or performed in parallel. Also, the ranging procedure of step 613 may be performed prior to the communication procedure of step 611.

The above description of FIG. 6 is made on the assumption that the mobile station transmits a handover request to the serving base station, and determines a target base station. Note that exemplary embodiments of present invention are applicable to the case where the serving base station transmits a handover request or the serving base station determines the target base station. In this case, the mobile station selectively transmits a handover indicate message to the serving base station. That is, the mobile station may or may not transmit a handover indicate message to the serving base station.

As described above, the mobile station and the target base station may communicate with each other using the temporary MS ID. In this case, the mobile station and the target base station may use the same flow ID generated for a service connection between the mobile station and the serving base station. That is, when the target base station does not indicate a change of flow IDs which have been used by the mobile station for a service connection with the serving base station, the mobile station and the target base station may use the same flow IDs without change.

Now, an exemplary method for supporting, at a target base station, a handover of a mobile station is described.

Figure 7:
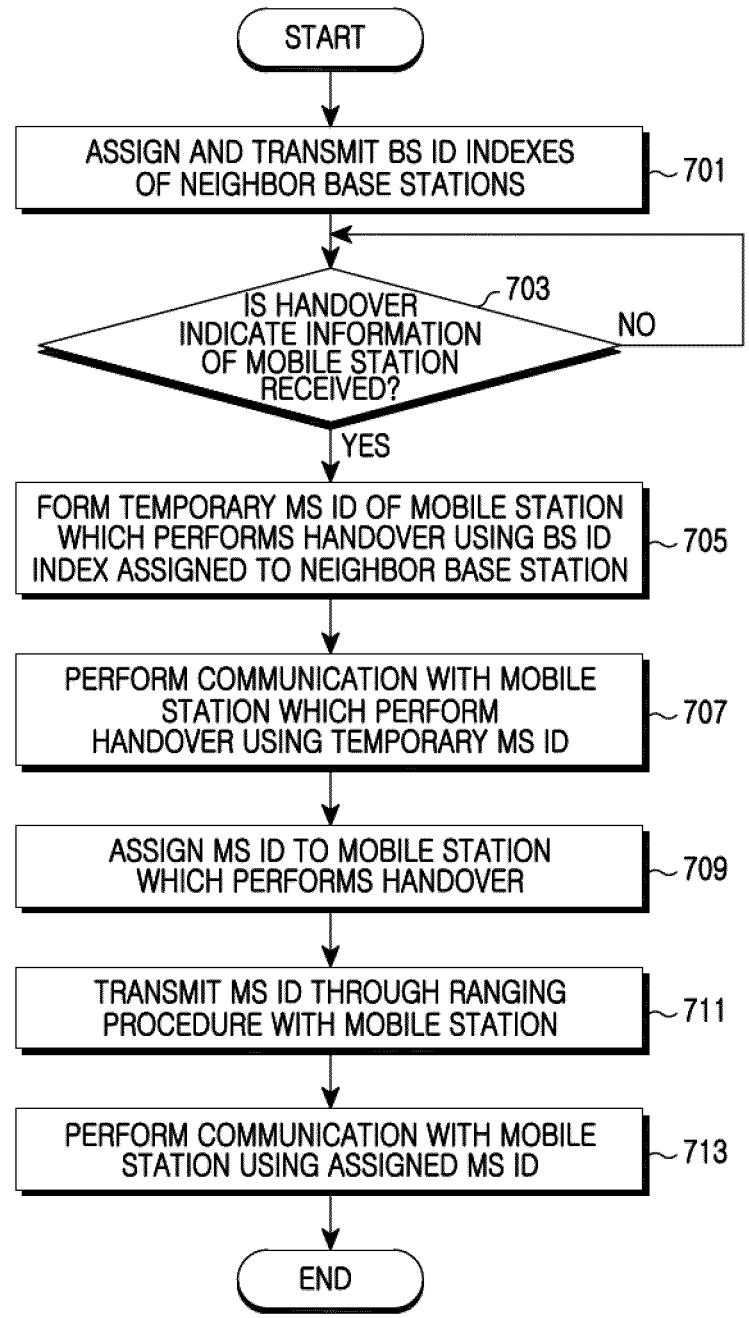
FIG. 7 illustrates a procedure for supporting, at a target base station, a handover of a mobile station in a wireless communication system according to an exemplary embodiment of the present invention.

FIG. 7 is a flowchart illustrating a procedure for supporting, at a target base station, a handover of a mobile station in a wireless communication system according to an exemplary embodiment of the present invention.

Referring to FIG. 7, in step 701, the target base station assigns BS ID indexes to neighbor base stations. That is, the target base station transmits the BS ID indexes assigned to the neighbor base stations to the neighbor base stations via a backbone.

After assigning the BS ID indexes to the neighbor base stations, the target base station determines whether a handover indicate information of a mobile station is received from a neighbor base station in step 703. For example, the target base station determines whether a handover indicate message of the mobile station is received from a serving base station of the mobile station via the backbone.

When the handover of the mobile station is informed, the target base station forms a temporary MS ID of the mobile station using a BS ID index assigned to a neighbor base station which has informed of the handover of the mobile station in step 705. For example, the target base station confirms an MS ID index assigned to the mobile station by the neighbor base station through the handover indicate message. After that, the target base station forms a temporary MS ID by combining the BS ID index assigned to the neighbor base station which has transmitted the handover indicate message and the MS ID index assigned to the mobile station performing the handover by the neighbor base station.

After forming the temporary MS ID of the mobile station, the target base station performs communication with the mobile station using the temporary MS ID in step 707. For example, the target base station forms a resource assignment message to be transmitted to the mobile station using the temporary MS ID, and transmits the resource assignment message. Also, the target base station confirms a bandwidth request message BW-Req transmitted by the mobile station through the temporary MS ID.

In step 709, the target base station forms an MS ID to be assigned to the mobile station.

After forming the MS ID to be assigned to the mobile station, the target base station transmits the formed MS ID to the mobile station through a ranging procedure with the mobile station in step 711. For example, the target base station transmits the MS ID to the mobile station using a ranging response message RNG-RSP.

After transmitting the MS ID, the target base station performs communication with the mobile station using the MS ID in step 713.

After that, the target base station ends the present algorithm.

In the above-described exemplary embodiment, the communication of step 707 between the mobile station and the target base station, and the ranging procedure of steps 709 to 711 between the mobile station and the target base station may be performed sequentially or performed in parallel. Also, the ranging procedure of steps 709 to 711 may be performed prior to the communication procedure of step 707.

Now, an exemplary handover method of a mobile station using a temporary MS ID in a wireless communication system is described.

Figure 8:
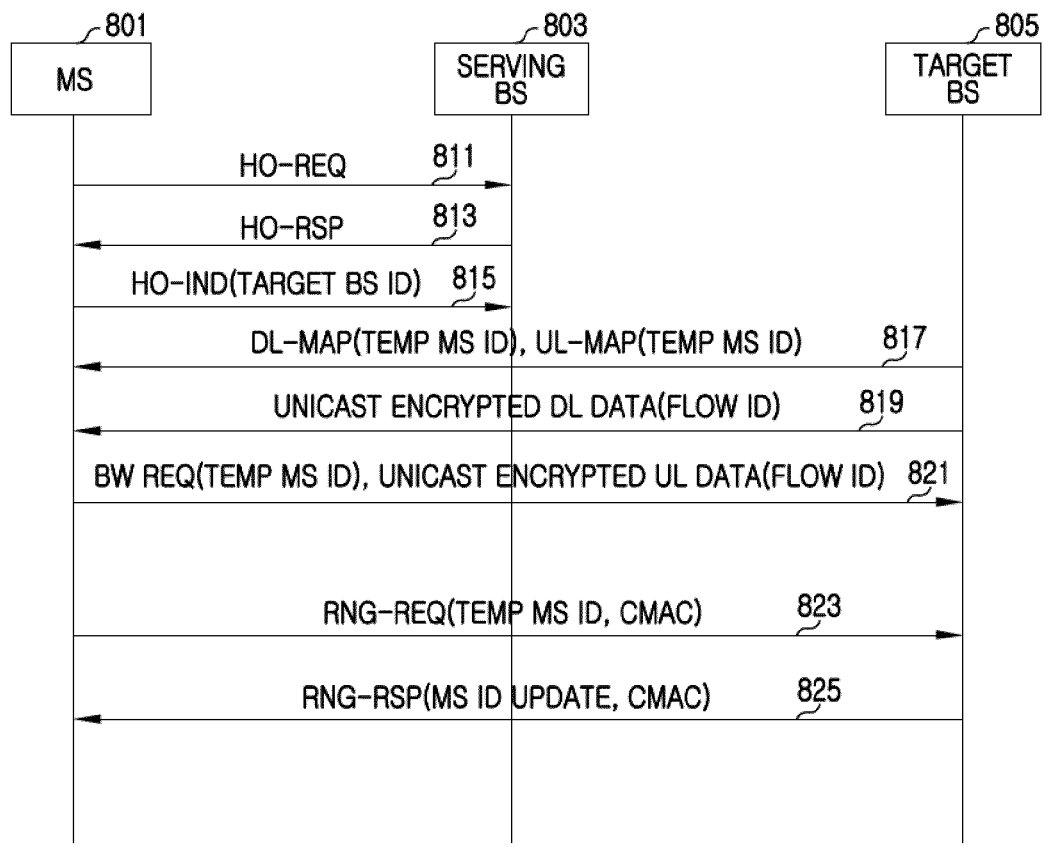
FIG. 8 illustrates a handover procedure of a mobile station in a wireless communication system according to an exemplary embodiment of the present invention.

FIG. 8 illustrates a handover procedure of a mobile station in a wireless communication system according to an exemplary embodiment of the present invention. In the following description, only signals transmitted/received using radio resources between a mobile station 801 and a serving base station 803, and between the mobile station 801 and a target base station 805, are illustrated.

Referring to FIG. 8, when the mobile station 801, which has received a service from the serving base station 803, desires a handover, the mobile station 801 transmits a handover request message HO-REQ to the serving base station 803 in step 811.

When the handover request message is received, the serving base station 803 confirms candidate base stations which can support the handover of the mobile station 801 among neighbor base stations to which the mobile station may perform a handover. At this point, the serving base station 803 confirms the candidate base stations which can support the handover of the mobile station 801 through the backbone.

In step 813, the serving base station 803 transmits a handover response message HO-RSP including information of the candidate base stations which support the handover of the mobile station 801 to the mobile station 801.

When the handover response message is received, the mobile station 801 selects a target base station 805 from the candidate base stations confirmed through the handover response message. In step 815, the mobile station 801 transmits a handover indicate message HO-IND to the serving base station 803 in order to inform the target base station 805 of the handover. Here, the handover indicate message includes information of the target base station 805.

After transmitting the handover indicate message, the mobile station 801 forms a temporary MS ID using a BS ID index assigned to the serving base station 803 by the target base station 805. For example, the mobile station 801 confirms BS ID indexes assigned to the serving base station 803 by neighbor base stations through a neighbor base station information message provided from the serving base station 803.

The serving base station 803 confirms the target base station 805 selected for the handover by the mobile station 801 through the handover indicate message. At this point, the serving base station 803 indicates the handover of the mobile station 801 to the target base station 805 through the backbone.

In step 817, when the handover of the mobile station 801 is indicated from the serving base station 803 through the backbone, the target base station 805 assigns a resource to the mobile station 801. For example, the target base station 805 forms a temporary MS ID for the mobile station 801 using a BS ID index assigned to the serving base station and an MS ID index assigned to the mobile station 801 by the serving base station 803. After that, the target base station 805 incorporates the temporary MS ID into a resource assignment message for the mobile station 801, and transmits the resource assignment message to the mobile station 801. At this point, mobile stations located in the service area of the target base station 805 confirm the temporary MS ID as an MS ID different from the MS IDs of the mobile stations themselves, and so do not use a region corresponding to the resource assignment message including the temporary MS ID. On the other hand, the mobile station 801 may confirm the resource assignment message transmitted by the target base station 805 using the above-formed MS ID.

In step 819, the target base station 805 transmits downlink data to the mobile station 801 using a downlink resource assigned to the mobile station 801. At this point, in the case where the target base station 805 does not indicate a change of a flow ID which has been used for a service connection between the mobile station 801 and the serving base station 803, the target base station 805 transmits the downlink data using the flow ID which has been used for the service connection between the mobile station 801 and the serving base station 803.

In step 821, the mobile station 801 transmits a bandwidth request message BW-Req and uplink data using a resource assigned by the target base station 805. At this point, the mobile station 801 incorporates the temporary MS ID into the bandwidth request message and transmits the bandwidth request message to the target base station 805. Also, in the case where the target base station 805 does not indicate a change of a flow ID which has been used for a service connection between the mobile station 801 and the serving base station 803, the mobile station 801 transmits the uplink data using the same flow ID which has been used for the service connection with the serving base station 803.

In steps 823 and 825, the mobile station 801 performs a ranging procedure with the target base station 805. For example, in step 823, the mobile station 801 transmits a ranging request message RNG-REQ to the target base station 805 via a resource obtained by transmitting a ranging code to the target base station 805. In step 825, the target base station transmits a response message RNG-RSP in reply to the ranging request message provided from the mobile station 801 to the mobile station 801. At this point, the target base station 805 incorporates MS ID information newly assigned to the mobile station 801 into the response message, and transmits the response message to the mobile station 801.

In an exemplary embodiment, the mobile station 801 and the target base station 805 may perform the resource assignment procedure and the data transmission/reception procedure of steps 817 to 821 and the ranging procedure of steps 823 and 825 sequentially or in parallel. Also, the ranging procedure of steps 823 and 825 may be performed prior to the resource assignment procedure and the data transmission/reception procedure of steps 817 to 821.

The above description of FIG. 8 is made on the assumption that the mobile station 801 transmits a handover request to the serving base station 803, and determines the target base station 805. Note that exemplary embodiments of present invention are applicable to the case where the serving base station 803 transmits the handover request or the serving base station 803 determines the target base station 805. In this case, the mobile station 801 selectively transmits a handover indicate message to the serving base station 803. That is, the mobile station 802 may or may not transmit a handover indicate message to the serving base station 803.

In the above-described exemplary embodiment, the serving base station incorporates BS ID index information assigned from neighbor base stations into a neighbor base station information message, and transmits the same to the mobile station. Accordingly, the mobile station confirms the BS ID index information assigned to the serving base station by the neighbor base stations through the neighbor base station information message provided from the serving base station.

According to an exemplary embodiment, the serving base station may transmit a handover message including BS ID index information assigned by neighbor base stations to the mobile station during a handover procedure of the mobile station. At this point, the serving base station transmits entire BS ID index information assigned by the neighbor base stations, or a portion of the BS ID index information to the mobile station.

Figure 9:
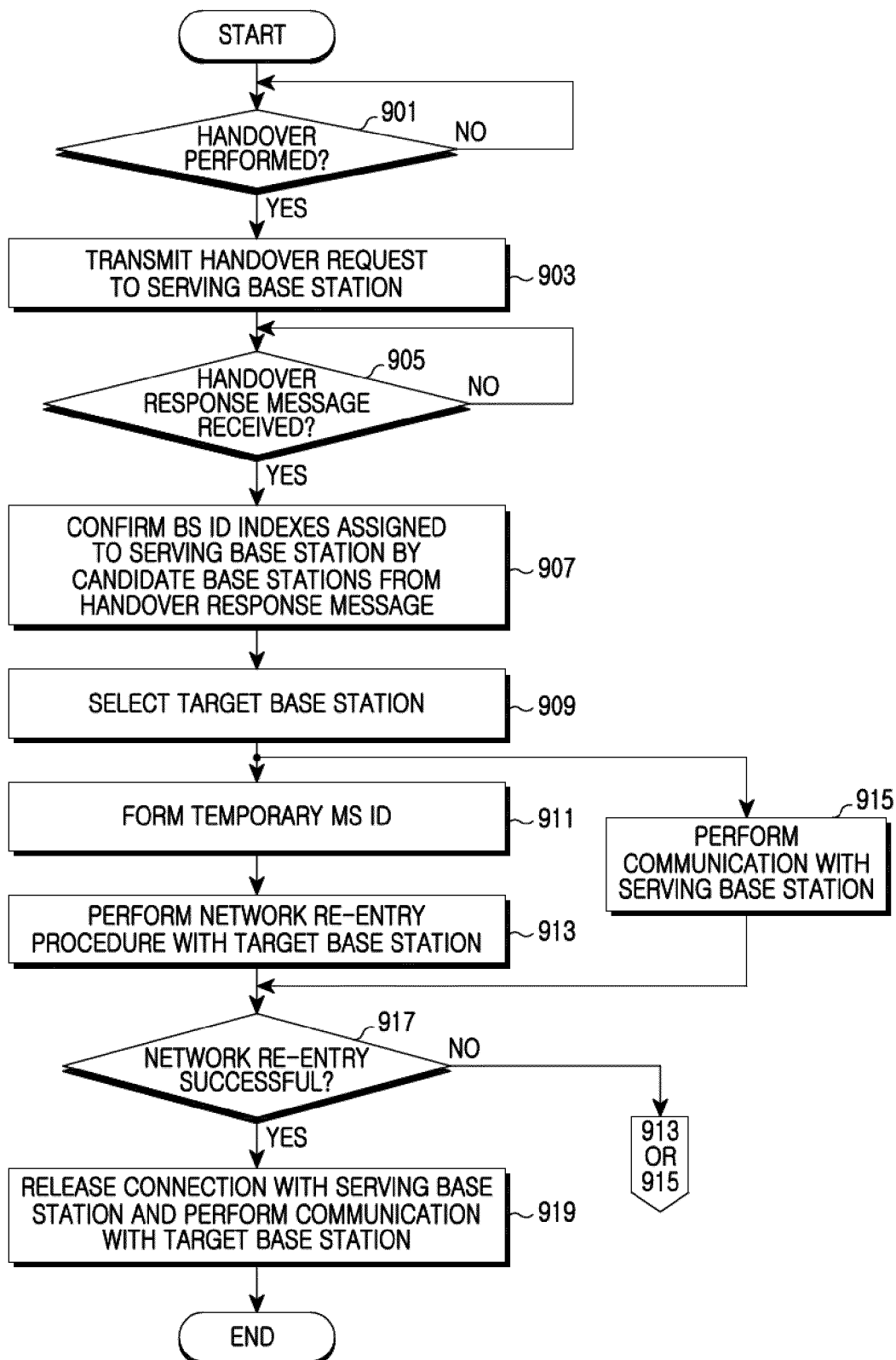
FIG. 9 illustrates a procedure for performing, at a mobile station, a handover in a wireless communication system according to an exemplary embodiment of the present invention.

Accordingly, as illustrated in FIG. 9, a mobile station may confirm BS ID index information assigned to the serving base station by the neighbor base stations from the handover message provided from the serving base station during the handover procedure.

FIG. 9 illustrates a procedure for performing, at a mobile station, a handover in a wireless communication system according to an exemplary embodiment of the present invention Referring to FIG. 9, in step 901, the mobile station determines whether to perform a handover to a neighbor base station. For example, the mobile station determines whether to perform a handover with consideration of a signal intensity of a serving base station.

When determining to perform the handover, the mobile station transmits a handover request to the serving base station in step 903.

In step 905, the mobile station determines whether a handover response message is received from the serving base station.

When the handover response message is received from the serving base station, the mobile station obtains information of candidate base stations which can support the handover of the mobile station from the handover response message in step 907. At this point, the mobile station obtains BS ID indexes assigned to the serving base station by the candidate base stations from the handover response message.

After confirming the candidate base stations, the mobile station determines a target base station for the handover among the candidate base stations step 909.

In step 911, the mobile station forms a temporary MS ID for performing communication with the target base station. For example, the mobile station forms a temporary MS ID using a BS ID index assigned to the serving base station by the target base station and an MS ID index assigned by the serving base station.

After forming the temporary MS ID, the mobile station performs a network re-entry procedure with the target base station using the temporary MS ID step 913.

In step 917, the mobile station determines whether the network re-entry procedure with the target base station is successfully completed.

When the network re-entry procedure with the target base station is not completed, the mobile station continues to perform the network re-entry procedure with the target base station in step 913.

In contrast, when the network re-entry procedure with the target base station is completed, the mobile station releases a connection with the serving base station and performs communication with the target base station in step 919. At this point, the mobile station performs the communication with the target base station using an MS ID assigned by the target base station through the network re-entry.

Also, after selecting the target base station in step 909, the mobile station performs communication with the serving base station in step 915. At this point, the mobile station performs the communication with the serving base station using an MS ID assigned by the serving base station.

After that, the mobile station proceeds to step 917 to determine whether the network re-entry procedure with the target base station is successfully completed.

When the network re-entry procedure with the target base station is not completed, the mobile station continues to perform communication with the serving base station in step 915.

In contrast, when the network re-entry procedure with the target base station is completed, the mobile station releases a connection with the serving base station and performs communication with the target base station in step 919. At this point, the mobile station performs the communication with the target base station using an MS ID assigned by the target base station through the network re-entry.

After that, the mobile station ends the present algorithm.

As described above, the mobile station confirms BS ID index information assigned to the serving base station by the neighbor base stations through a handover response message. At this point, while the serving base station determines whether a neighbor base station supports the handover of the mobile station, the neighbor base station may transmit BS ID index information assigned to the serving base station together with information as to whether the neighbor base station supports the mobile station to the serving base station.

The above description of FIG. 9 is made on the assumption that the mobile station transmits a handover request to the serving base station, and determines a target base station. Note that exemplary embodiments of present invention are applicable to the case where the serving base station transmits a handover request or the serving base station determines the target base station. In this case, the mobile station selectively transmits a handover indicate message to the serving base station. That is, the mobile station may or may not transmit a handover indicate message to the serving base station.

Now, an exemplary handover method of a mobile station using a temporary MS ID in a wireless communication system is described.

Figure 10:
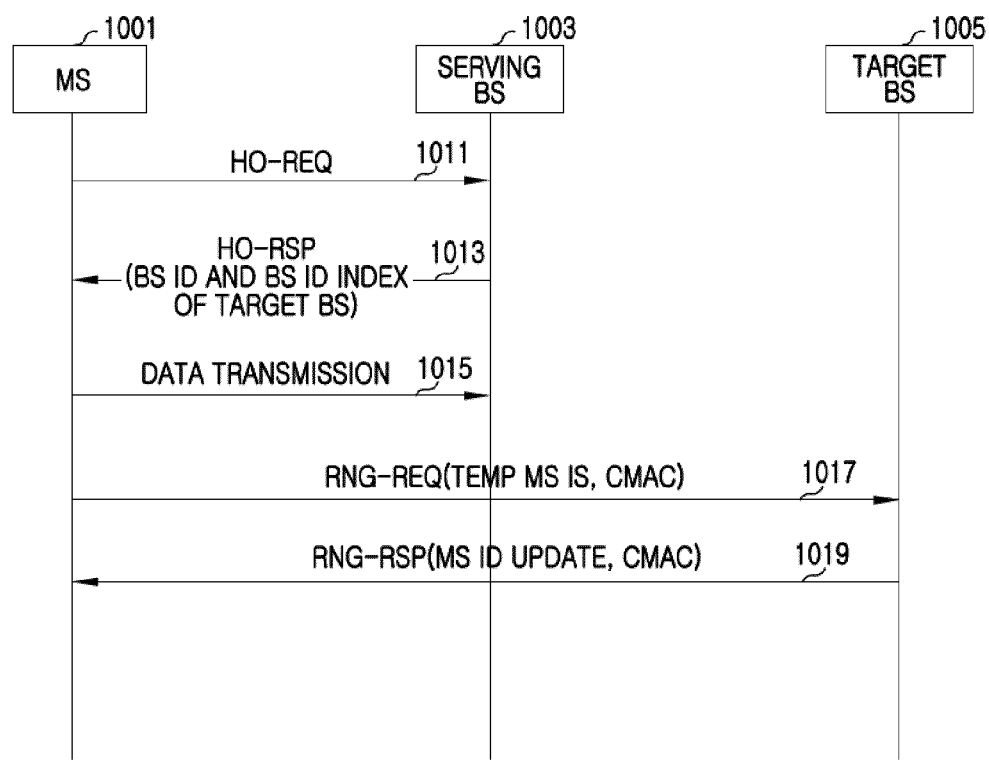
FIG. 10 illustrates a handover procedure of a mobile station in a wireless communication system according to an exemplary embodiment of the present invention.

FIG. 10 illustrates a handover procedure of a mobile station in a wireless communication system according to an exemplary embodiment of the present invention. In the following description, only signals transmitted/received using radio resources between a mobile station 1001 and a serving base station 1003, and between the mobile station 1001 and a target base station 1005, are illustrated.

Referring to FIG. 10, when the mobile station 1001, which has received a service from the serving base station 1003, desires a handover, the mobile station 1001 transmits a handover request message HO-REQ to the serving base station 1003 instep 1011.

When the handover request message is received, the serving base station 1003 confirms candidate base stations which can support the handover of the mobile station 1001 among neighbor base stations to which the mobile station may perform a handover. For example, the serving base station 1003 confirms the candidate base stations which can support the handover of the mobile station 1001 among the neighbor base stations through the backbone.

In step 1013, the serving base station 1003 forms a handover response message HO-RSP including information of the candidate base stations which support the handover of the mobile station 1001, and transmits the handover response message to the mobile station 1001. At this point, the serving base station 1003 transmits BS ID index information assigned from the candidate base stations together with the handover response message.

The mobile station 1001 confirms the candidate base stations which allow the handover and the BS ID indexes assigned to the serving base station by the candidate base stations through the handover response message.

The mobile station 1001 selects a target base station for the handover from the candidate base stations.

In step 1015, the mobile station 1001 may continue to communicate with the serving base station until a network re-entry procedure with the target base station 1005 is completed. At this point, the mobile station 1001 performs communication with the serving base station 1003 using an MS ID assigned by the serving base station 1003.

After selecting the target base station 1005, the mobile station 1001 forms a temporary MS ID using a BS ID index assigned to the serving base station 1003 by the target base station. For example, the mobile station 1001 forms a temporary MS ID using a BS ID index assigned to the serving base station 1003 by the target base station 1005 and an MS ID index assigned by the serving base station 1003.

In steps 1017 and 1019, the mobile station 1001 performs a network re-entry procedure with the target base station using the temporary MS ID. For example, the mobile station 1001 transmits a ranging request message RNG REQ to the target base station 1005 via a resource obtained by transmitting a ranging code to the target base station 1005 in step 1017. The target base station 1005 transmits a response message RNG RSP in reply to the ranging request message provided from the mobile station 1001 in step 1019. At this point, the target base station 1005 incorporates MS ID information newly assigned to the mobile station 1001 into the response message and transmits the response message to the mobile station 1001.

At this point, the communication in step 1015 between the mobile station 1001 and the serving base station 1003, and the network re-entry procedure of steps 1017 and 1019 between the mobile station 1001 and the target base station 1005 may be performed sequentially, or performed in parallel.

In the above-described exemplary embodiment, the serving base station may transmit a handover message including BS ID index information assigned by the neighbor base stations to the mobile station during the handover procedure of the mobile station. Accordingly, the mobile station may confirm the BS ID index information assigned to the serving base station by the neighbor base stations from the handover message provided from the serving base station during the handover procedure.

In an exemplary embodiment, the serving base station may transmit a separate message including BS ID index information assigned by the neighbor base stations to the mobile station. At this point, the serving base station transmits entire BS ID index information or a portion of the BS ID index information assigned by the neighbor base stations to the mobile station.

Accordingly, the mobile station may confirm the BS ID index information assigned to the serving base station by the neighbor base stations from the separate message including the BS ID index information.

Now, an exemplary construction of a mobile station for a handover to a target base station is described.

Figure 11:
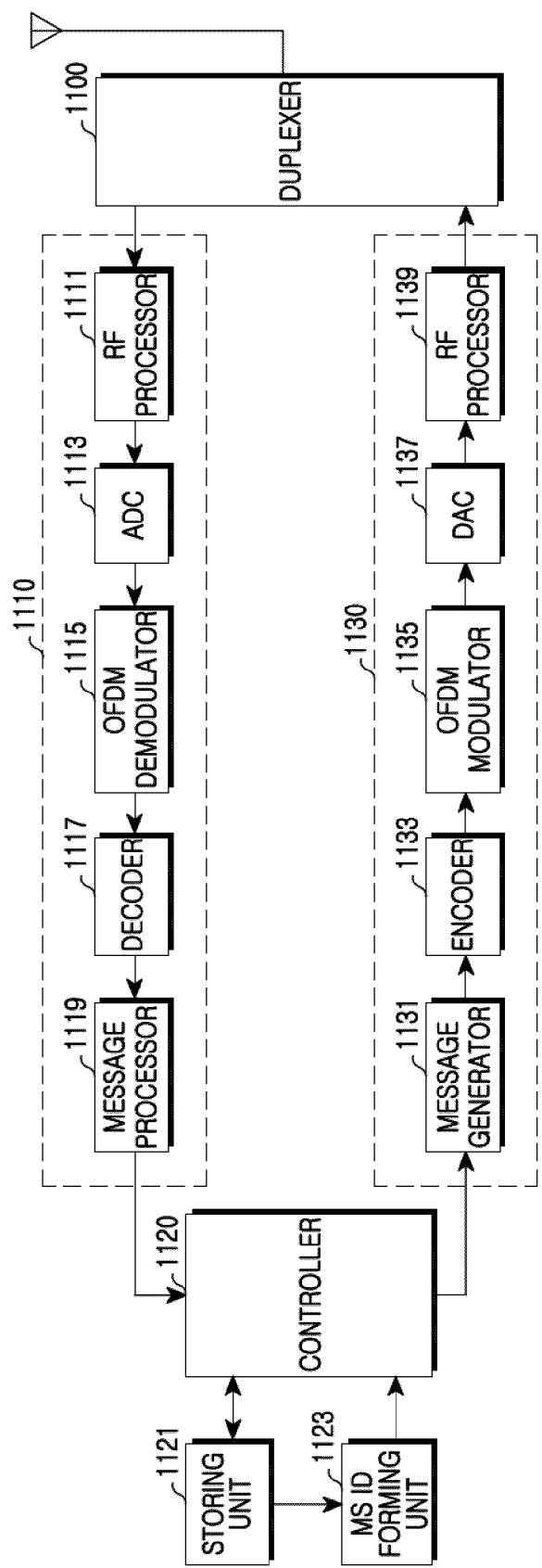
FIG. 11 illustrates a mobile station for a handover in a wireless communication system according to an exemplary embodiment of the present invention.

FIG. 11 is a block diagram illustrating a mobile station for a handover in a wireless communication system according to an exemplary embodiment of the present invention.

Referring to FIG. 11, the mobile station includes a duplexer 1100, a receiver 1110, a controller 1120, and a transmitter 1130.

The duplexer 1100 transmits a transmission signal provided from the transmitter 1130 via an antenna, and provides a reception signal from the antenna to the receiver 1110 according to a duplexing scheme.

The receiver 1110 includes a Radio Frequency (RF) processor 1111, an Analog/Digital Converter (ADC) 1113, an OFDM demodulator 1115, a decoder 1117, and a message processor 1119.

The RF processor 1111 converts an RF signal provided from the duplexer 1100 to a baseband analog signal. The ADC 1113 converts an analog signal provided from the RF processor 1111 to digital sample data. The OFDM demodulator 1115 converts sample data in a time domain provided from the ADC 1113 to data in a frequency domain by performing a Fourier Transform. For example, the OFDM demodulator 1115 converts sample data in the time domain to data in the frequency domain by performing a Fast Fourier Transform (FFT).

The decoder 1117 demodulates and decodes a signal provided from the OFDM demodulator 1115 according to a Modulation and Coding Scheme (MCS) level.

The message processor 1119 detects a control message from a signal provided by the decoder 1117 and provides the detected control message to the controller 1120. For example, the message processor 1119 detects a neighbor base station information message, a handover response message, and a resource assignment message provided from a serving base station, and a resource assignment message provided from a target base station, and provides those messages to the controller 1120.

The controller 1120 controls an overall operation and a handover of the mobile station. For example, the controller 1120 confirms BS ID index information assigned to the serving base station by neighbor base stations through a neighbor base station information message provided from the message processor 1119. For another example, the controller 1120 may confirm the BS ID index information assigned to the serving base station by the neighbor base stations through a handover message provided from the message processor 1119. For still another example, the controller 1120 may confirm the BS ID index information assigned to the serving base station by the neighbor base stations through a separate message including the BS ID index information provided from the message processor 1119.

Also, the controller 1120 determines whether to perform a handover by considering a signal intensity. When determining to perform the handover, the controller 1120 selects a target base station for the handover from candidate base stations obtained by transmitting a handover request to the serving base station. At this point, the controller 1120 obtains candidate base station information from a handover response message provided from the message processor 1119.

After selecting the target base station, the controller 1120 controls to perform a network re-entry procedure with the target base station using a temporary MS ID provided from an MS ID forming unit 1123. At this point, the controller 1120 controls to continue to communicate with the serving base station until the network re-entry procedure with the target base station is completed. Here, the controller 1120 controls to communicate with the serving base station using an MS ID assigned by the serving base station.

A storing unit 1121 stores BS ID index information confirmed by the controller 1120 and assigned to the serving base station by the neighbor base stations.

When the controller 1120 determines the target base station, the MS ID forming unit 1123 confirms a BS ID index assigned to the serving base station by the target base station from the storing unit 1121. After that, the MS ID forming unit 1123 forms a temporary MS ID for communicating with the target base station by combining the confirmed BS ID index and an MS ID index assigned from the serving base station.

The transmitter 1130 includes a message generator 1131, an encoder 1133, an OFDM modulator 1135, a Digital/Analog Converter (DAC) 1137, and an RF processor 1139.

The message generator 1131 generates a control message for a handover under control of the controller 1120. For example, when the controller 1120 determines the handover, the message generator 1131 generates a handover request message to be transmitted to the serving base station. Also, when the controller 1120 determines a target base station for the handover, the message generator 1131 generates a handover indicate message indicating the handover to the target base station. Also, when the mobile station performs communication with the target base station using a temporary MS ID under control of the controller 1120, the message generator 1131 forms a bandwidth request message including the temporary MS ID. Also, when the target base station does not indicate change of a flow ID, the message generator 1131 forms uplink data using the flow ID which has been used for a service connection with the serving base station.

The encoder 1133 encodes and modulates a transmission signal or a message provided from the message generator 1131 according to a relevant MCS level.

The OFDM modulator 1135 converts data in the frequency domain provided from the encoder 1133 to sample data (OFDM symbol) in the time domain by performing an Inverse Fourier Transform. For example, the OFDM modulator 1135 converts data in the frequency domain to sample data (OFDM symbol) in the time domain by performing an Inverse Fast Fourier Transform (IFFT).

The DAC 1137 converts the sample data provided from the OFDM modulator 1135 to an analog signal. The RF processor 1139 converts a baseband analog signal provided from the DAC 1137 to an RF signal.

In the above-described exemplary embodiment, when performing a network re-entry procedure with the target base station, the controller 1120 controls to maintain communication with the serving base station.

In an exemplary embodiment, the controller 1120 selects the target base station and then transmits a handover indicate message to the serving base station. After that, the controller 1120 controls to communicate with the target base station using a temporary MS ID provided from the MS ID forming unit 1123. After that, while performing the communication with the target base station, the controller 1120 controls to perform a network re-entry procedure with the target base station. For example, the controller 1120 may control the communication with the target base station and the network re-entry procedure to be performed sequentially or in parallel. Also, the controller 1120 may control the network re-entry procedure with the target base station to be performed prior to the communication with the target base station.

Now, an exemplary construction of a base station for controlling a handover of a mobile station is described.

Figure 12:
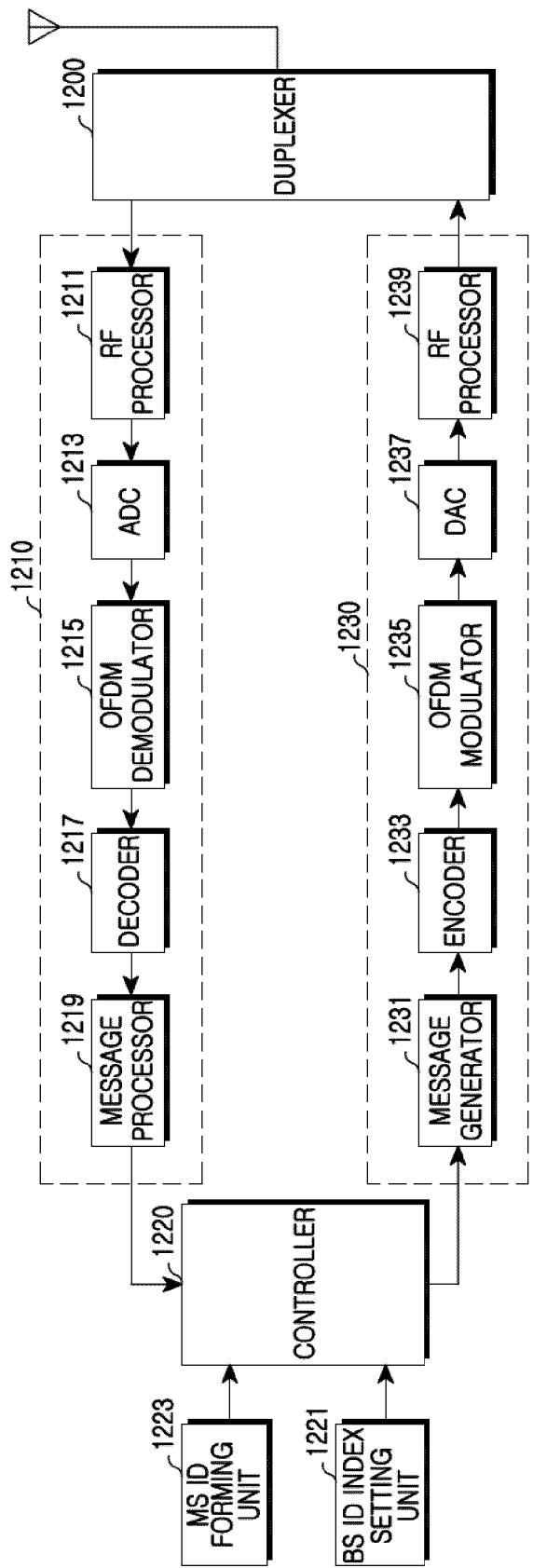
FIG. 12 illustrates a base station for controlling a handover of a mobile station in a wireless communication system according to an exemplary embodiment of the present invention.

FIG. 12 is a block diagram illustrating a base station for controlling a handover of a mobile station in a wireless communication system according to an exemplary embodiment of the present invention.

Referring to FIG. 12, the base station includes a duplexer 1200, a receiver 1210, a controller 1220, and a transmitter 1230.

The duplexer 1200 transmits a transmission signal provided from the transmitter 1230 via an antenna, and provides a reception signal from the antenna to the receiver 1210 according to a duplexing scheme.

The receiver 1210 includes an RF processor 1211, an ADC 1213, an OFDM demodulator 1215, a decoder 1217, and a message processor 1219.

The RF processor 1211 converts an RF signal provided from the duplexer 1200 to a baseband analog signal. The ADC 1213 converts an analog signal provided from the RF processor 1211 to digital sample data. The OFDM demodulator 1215 converts sample data in a time domain provided from the ADC 1213 to data in a frequency domain by performing a Fourier Transform. For example, the OFDM demodulator 1215 converts sample data in the time domain to data in the frequency domain by performing an FFT.

The decoder 1217 demodulates and decodes a signal provided from the OFDM demodulator 1215 according to an MCS level.

The message processor 1219 detects a control message from a signal provided by the decoder 1217 and provides the detected control message to the controller 1220. For example, the message processor 1219 detects a handover request message and a handover indicate message provided from a mobile station to which the base station has provided a service, and provides those messages to the controller 1220.

The controller 1220 controls an overall operation of the base station and a handover of a mobile station located in a service area. For example, the controller 1220 controls to transmit BS ID index information assigned by neighbor base stations through a backbone to mobile stations located in the service area. Also, the controller 1220 controls to transmit a BS ID index assigned to neighbor base stations by a BS ID index setting unit 1221 to the neighbor base stations through the backbone.

The controller 1220 confirms neighbor base stations to which a mobile station requesting a handover can perform the handover through a handover request message provided from the message processor 1219. After that, the controller 1220 determines whether the neighbor base stations can support a handover of the mobile station through the backbone.

When receiving a handover indicate message from the message processor 1219, the controller 1220 confirms a target base station to which the mobile station is to perform the handover. After that, the controller 1220 informs the target base station of the handover of the mobile station through the backbone.

When a handover of a mobile station is informed from a neighbor base station through the backbone, the controller 1220 assigns a resource to the mobile station included in a handover indicate message. At this point, the controller 1220 controls to form a resource assignment message using a temporary MS ID of the mobile station formed by an MS ID forming unit 1223. When assigning an MS ID to the mobile station, the controller 1220 controls to form a resource assignment message using the MS ID assigned to the mobile station.

The BS ID index setting unit 1221 determines BS ID indexes to be assigned to neighbor base stations.

The MS ID forming unit 1223 forms a temporary MS ID for performing communication with a mobile station to which an MS ID has not yet been assigned, and an MS ID to be assigned to the mobile station. Here, when forming the temporary MS ID, the MS ID forming unit 1223 forms the temporary MS ID by combining a BS ID index assigned to a neighbor base station which has indicated a handover of the mobile station, and an MS ID index assigned to the mobile station requesting the handover by the neighbor base station.

The transmitter 1230 includes a message generator 1231, an encoder 1233, an OFDM modulator 1235, a DAC 1237, and an RF processor 1239.

The message generator 1231 generates a control message for a handover under control of the controller 1220. For example, the message generator 1231 forms neighbor base station information message such that the message includes BS ID index information assigned from neighbor base stations. In the case where the controller 1220 determines whether neighbor base stations support a handover through the backbone, the message generator 1231 generates a handover response message including information of neighbor base stations which can support the handover of a mobile station. Also, in the case where the controller 1220 is informed of the handover of the mobile station through the backbone and assigns a resource to the mobile station, the message generator 1231 generates a resource assignment message including resource assignment information. At this point, the message generator 1231 forms a resource assignment message including a temporary MS ID of the mobile station. After that, when the base station assigns an MS ID to the mobile station under control of the controller 1220, the message generator 1231 forms a resource assignment message including the MS ID assigned to the mobile station. Also, when the base station does not indicate change of a flow ID of the mobile station, the message generator 1231 forms downlink data using the flow ID used by the mobile station for a service connection with a serving base station.

The encoder 1233 encodes and modulates a transmission signal or a message provided from the message generator 1231 according to a relevant MCS level.

The OFDM modulator 1235 converts data in the frequency domain provided from the encoder 1233 to sample data (OFDM symbol) in the time domain by performing an Inverse Fourier Transform. For example, the OFDM modulator 1235 converts data in the frequency domain to sample data (OFDM symbol) in the time domain by performing an IFFT.

The DAC 1237 converts the sample data provided from the OFDM modulator 1235 to an analog signal. The RF processor 1239 converts a baseband analog signal provided from the DAC 1237 to an RF signal.

Though not shown, the base station further includes a wired interface for performing communication with a neighbor base station. That is, the base station transmits a BS ID index assigned to a neighbor base station to the neighbor base station via the wired interface, and receives a BS ID index assigned from a neighbor base station via the wired interface.

In the above-described exemplary embodiment, the base station transmits BS ID index information assigned from the neighbor base stations to mobile stations located in its service area using a neighbor base station information message. In an exemplary embodiment, the base station may transmit BS ID index information assigned from neighbor base stations to a mobile station using a handover message. In this case, the message generator 1231 generates the handover message such that the handover message includes the BS ID index information assigned from the neighbor base stations. In an exemplary embodiment, the base station may transmit a separate message including BS ID index information assigned from neighbor base stations to a mobile station. In this case, the message generator 1231 generates the separate message including the BS ID index information assigned from the neighbor base stations.

As described above, by performing communication with a target base station newly accessed through a handover using an MS ID configured to represent a neighbor base station in a wireless communication system, the mobile station which performs the handover may reduce an overhead generated for assignment of a CID from the target base station, and perform communication with the target base station newly accessed through the handover without an assignment procedure of the CID.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described exemplary embodiments but should be determined by not only the appended claims but also the equivalents thereof.

What is claimed is:

1. A method for performing, at a mobile station, a handover in a wireless communication system, the method comprising:

confirming at least one Base Station IDentifier (BS ID) index indicating a serving base station to at least one neighbor base station, the BS ID comprising an index determined in the at least one neighbor base station and identifying only the serving base station from among one or more base stations to the at least one neighboring base station;

confirming a target base station for a handover;

forming a temporary Mobile Station IDentifier (MS ID) using an assigned BS ID index determined by the target base station, the assigned BS ID index identifying only the serving base station to the target base station, and an MS ID index assigned to the mobile station by the serving base station;

performing a network re-entry procedure with the target base station using the temporary MS ID; and performing communication with the serving base station until the network re-entry procedure with the target base station is completed.

2. The method of claim 1, wherein the confirming of the at least one BS ID index comprises confirming at least one BS ID index identifying only the serving base station to the at least one neighbor base station through a neighbor base station information message NeighBoR(NBR)-Advertisement (ADV) provided from the serving base station.

3. The method of claim 1, wherein the confirming of the at least one BS ID index comprises confirming at least one BS ID index identifying only the serving base station to the at least one neighbor base station through at least one handover message provided from the serving base station, for the handover.

4. The method of claim 1, wherein sizes of the BS ID index and the MS ID index which form the temporary MS ID are changeable.

5. The method of claim 1, wherein the performing of the communication with the serving base station comprises performing communication with the serving base station using an MS ID assigned from the serving base station.

6. The method of claim 1, further comprising, when the network re-entry procedure with the target base station is completed:

terminating the communication with the serving base station; and performing communication with the target base station using an MS ID assigned from the target base station through the network re-entry procedure.

7. A method for supporting, at a base station, a handover of a mobile station in a wireless communication system, the method comprising:

in the base station, determining at least one Base Station IDentifier (BS ID) index corresponding to at least one neighbor base station, the BS ID index identifying only the neighbor base station from among one or more base stations to the base station;

when the handover of the mobile station is indicated from the neighbor base station, forming a temporary Mobile Station IDentifier (MS ID) for the mobile station using the BS ID index corresponding to and identifying only the neighbor base station to the base station, and an MS ID index assigned to the mobile station performing the handover by the neighbor base station; and performing a network re-entry procedure with the mobile station using the temporary MS ID.

8. The method of claim 7, wherein the determining of the at least one BS ID index comprises:

assigning the at least one BS ID index to the corresponding at least one neighbor base station; and when the at least one neighbor base station requests the handover of the mobile station, incorporating the BS ID index assigned to the neighbor base station into a response signal in reply to the handover request, and transmitting the response signal to the neighbor base station.

9. The method of claim 7, wherein sizes of the BS ID index and the MS ID index which form the temporary MS ID are changeable.

10. The method of claim 7, wherein the performing of the network re-entry procedure comprises:

when a ranging request signal comprising the temporary MS ID is received, assigning an MS ID to a mobile station which has transmitted the ranging request signal; and transmitting a ranging response signal comprising the assigned MS ID to the mobile station.

11. The method of claim 10, further comprising, when the network re-entry procedure is completed, performing communication with the mobile station using the MS ID assigned to the mobile station.

12. The method of claim 7, further comprising:

confirming at least one BS ID index assigned from at least one neighbor base station; and incorporating the at least one BS ID index into a neighbor base station information message NeighBoR(NBR)-Advertisement(ADV) comprising information of at least one neighbor base station.

13. The method of claim 7, further comprising:

confirming at least one BS ID index assigned from at least one neighbor base station; and incorporating the at least one BS ID index into at least one handover message transmitted to the mobile station, for the handover, and transmitting the handover message to at least one mobile station.

14. An apparatus of a mobile station for a handover in a wireless communication system, the apparatus comprising:

a transmitter for transmitting a transmission signal;

a receiver for receiving a reception signal;

a Mobile Station IDentifier (MS ID) forming unit for forming a temporary MS ID using a Base Station IDentifier (BS ID) index determined by the target base station and identifying only a serving base station from among one or more base stations to the target base station for the handover, and an MS ID index assigned to the mobile station by the serving base station; and a controller for, when the handover to the target base station is performed, performing a control to perform a network re-entry procedure with the target base station using the temporary MS ID formed by the MS ID forming unit, and performing a control to perform communication with the serving base station until the network re-entry procedure with the target base station is completed.

15. The apparatus of claim 14, wherein the controller confirms at least one BS ID index identifying only the serving base station to at least one neighbor base station through a neighbor base station information message NeighBoR (NBR)-Advertisement(ADV) provided from the serving base station.

16. The apparatus of claim 14, wherein the controller confirms at least one BS ID index identifying only the serving base station to at least one neighbor base station through at least one handover message provided from the serving base station, for the handover.

17. The apparatus of claim 14, wherein the MS ID forming unit is able to change sizes of the BS ID index and the MS ID index forming the temporary MS ID.

18. The apparatus of claim 14, wherein the controller controls to communicate with the serving base station using an MS ID assigned from the serving base station until the network re-entry procedure with the target base station is completed.

19. The apparatus of claim 14, wherein, when the network re-entry procedure with the target base station is completed, the controller controls to terminate the communication with the serving base station, and controls to communicate with the target base station using an MS ID assigned from the target base station through the network re-entry procedure.

20. An apparatus of a base station, for supporting a handover of a mobile station in a wireless communication system, the apparatus comprising:
  a transmitter for transmitting a transmission signal;
  a receiver for receiving a reception signal;
  a Base Station IDentifier (BS ID) index setting unit for determining at least one BS ID index and assigning the at least one BS ID index to at least one neighbor base station, the BS ID index identifying only the at least one neighbor base station to the base station;
  a wired interface for transmitting to the at least one neighbor base station the at least one BS ID index assigned to and identifying the at least one neighbor base station;
  a Mobile Station IDentifier (MS ID) forming unit for, when the handover of the mobile station is indicated from the neighbor base station via the wired interface, forming a temporary MS ID for the mobile station using the BS ID index identifying only the neighbor base station to the base station, and an MS ID index assigned to the mobile station performing the handover by the neighbor base station; and
  a controller for performing a control to perform a network re-entry procedure with the mobile station using the temporary MS ID.

21. The apparatus of claim 20, wherein the MS ID forming unit is able to change sizes of the BS ID index and the MS ID index forming the temporary MS ID.

22. The apparatus of claim 20, wherein the controller assigns a new MS ID to the mobile station through the network re-entry procedure with the mobile station.

23. The apparatus of claim 20, wherein the controller incorporates at least one BS ID index determined by and provided from at least one neighbor base station via the wired interface into a neighbor base station information message NeighBoR (NBR)-Advertisement(ADV) comprising information of at least one neighbor base station, and transmits the neighbor base station information message to at least one mobile station.

24. The apparatus of claim 20, wherein the controller incorporates at least one BS ID index determined by and provided from at least one neighbor base station through the wired interface into at least one handover message transmitted to the mobile station, for the handover, and transmits the handover message to at least one mobile station.

* * * * *